UNITED STATES PATENT OFFICE.

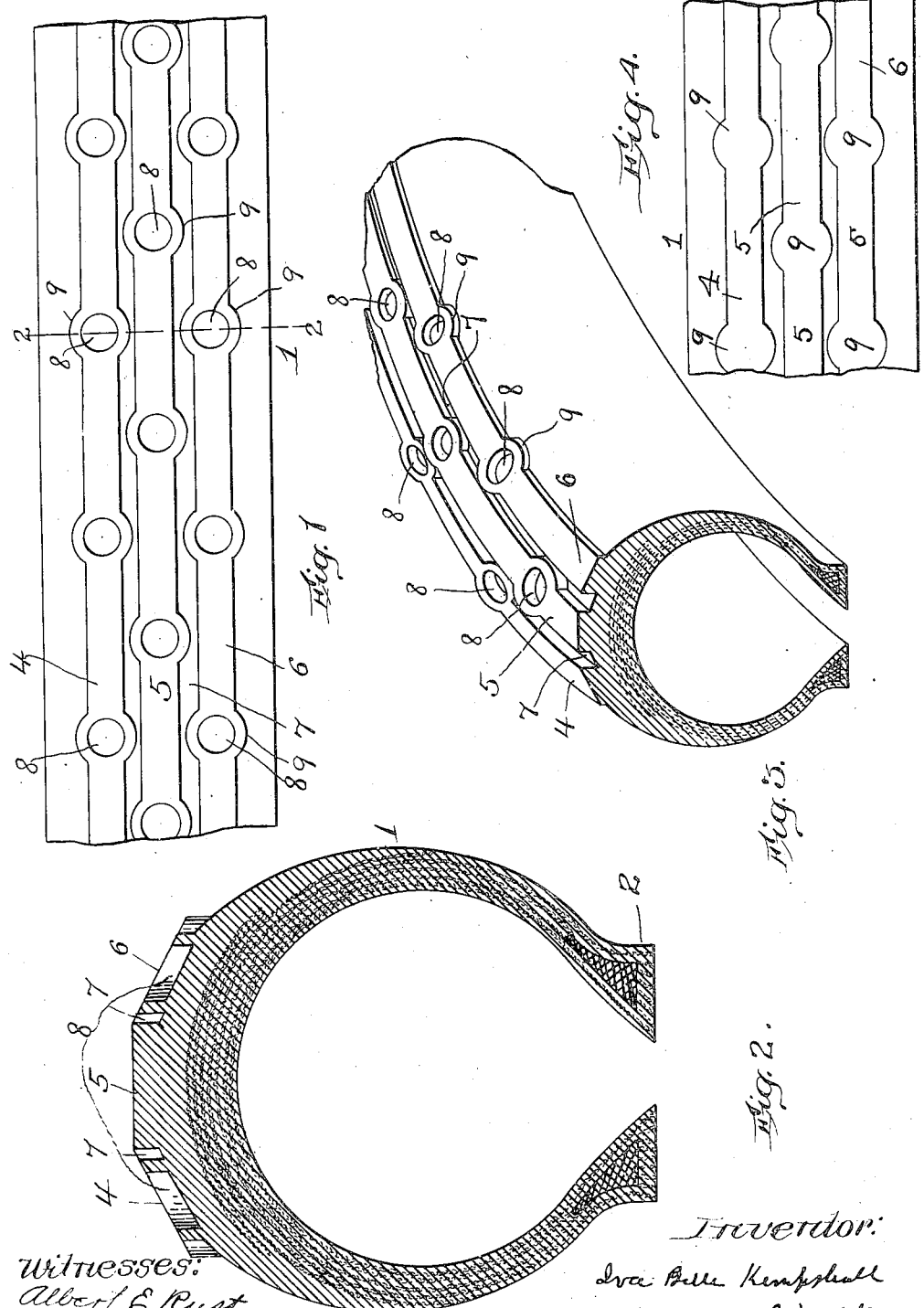

IVA BELLE KEMPSHALL, OF BOSTON, MASSACHUSETTS.

AUTOMOBILE-TIRE.

942,567. Specification of Letters Patent. Patented Dec. 7, 1909.

Application filed August 13, 1909. Serial No. 512,700.

*To all whom it may concern:*

Be it known that I, IVA BELLE KEMPSHALL, of Boston, in the county of Suffolk and State of Massachusetts, have invented certain new and useful Improvements in Automobile-Tires, of which the following is a specification.

This invention relates to an improvement in automobile tires and consists in the provision of means to prevent skidding of the tire.

Figure 1 is a top plan view of the tread portion of a tire constructed in accordance with my invention, showing the series of raised ribs, each formed with a series of recesses. Fig. 2 is a cross-sectional view of the same on line 2—2 of Fig. 1, showing the arrangement of the ribs with relation to each other, and also the construction of the pockets. Fig. 3 is a detail perspective view of the same. Fig. 4 shows a top plan view of a tread portion of a tire constructed in accordance with the invention, showing the series of raised ribs with the enlargements but without the recesses.

The same symbols of reference indicate the same parts in all of the figures.

1 represents a tire, or wear member of a tire, of any preferred construction, the surface of which is composed of rubber. As shown, this member of the tire is adapted to be secured to the wheel by beads, as 2. I have not shown the wheel or the inner tube, as they form no part of my invention and are well known constructions.

While I have shown my invention adapted for use with a wear member of a pneumatic tire, I do not wish to be understood as limiting my invention to a pneumatic tire, as it is equally applicable and intended for use upon all classes of resilient tires, whether solid, pneumatic, cushion, or otherwise.

The tread portion of the tire I form with a series, here shown as three, of continuous longitudinal ribs 4, 5, 6. The rib 5 is separated from the ribs 4 and 6 by longitudinal grooves 7, that is to say, all but the outer ribs are separated from one another by a groove or space, as 7. Each rib is formed with a series of enlargements 9. As shown, the enlargements of one rib are staggered with reference to those of the adjacent rib. This arrangement may be modified. Further, as shown, each enlargement is formed with a pocket, as 8. The shape of this pocket, however, may be modified and the pocket or depression may, or may not be employed, as desired.

In Fig. 4 the tire is illustrated as being provided with the ribs and the enlargements 9 but without the pockets or depressions.

In operation, the ribs and enlargements coöperate in maintaining tire contact and preventing skidding, as well as other forms of tire slip.

The ribs 4, 5, and 6 present continuous edges extending around the circumference of the tire, these edges engaging the road or track and opposing the tendency of the tire to skid or slip sidewise.

The enlargements 9 form protuberances on the above mentioned edges at intervals, and increase the slip-resisting engagement of the ribs with the road or track.

The walls of the pockets 8 formed in the enlargements 9 further increase the resistance of the ribs to side slip, and constitute suction cups which increase the traction of the tire.

Having thus explained the nature of my invention and described a way of constructing and using the same, though without attempting to set forth all of the forms in which it may be made, or all of the modes of its use, what I claim and desire to secure by Letters Patent is:—

1. An anti-skidding tire for automobiles provided with a rubber surface, formed along the tread with a series of continuous longitudinal ribs, each of which presents continuous edges extending around the tire, and is formed with a series of pockets.

2. An anti-skidding tire for automobiles provided with a rubber surface, formed along the tread with a series of continuous longitudinal ribs presenting continuous edges extending around the tire, each of the ribs being formed with a series of enlargements forming protuberances on said edges.

In testimony whereof I have affixed my signature, in presence of two witnesses.

IVA BELLE KEMPSHALL.

Witnesses:
 H. L. ROBBINS,
 P. W. PEZZETTI.